D. L. WINTERS.
AUTOMOBILE ATTACHMENT.
APPLICATION FILED MAY 22, 1917.
1,278,410.
Patented Sept. 10, 1918.
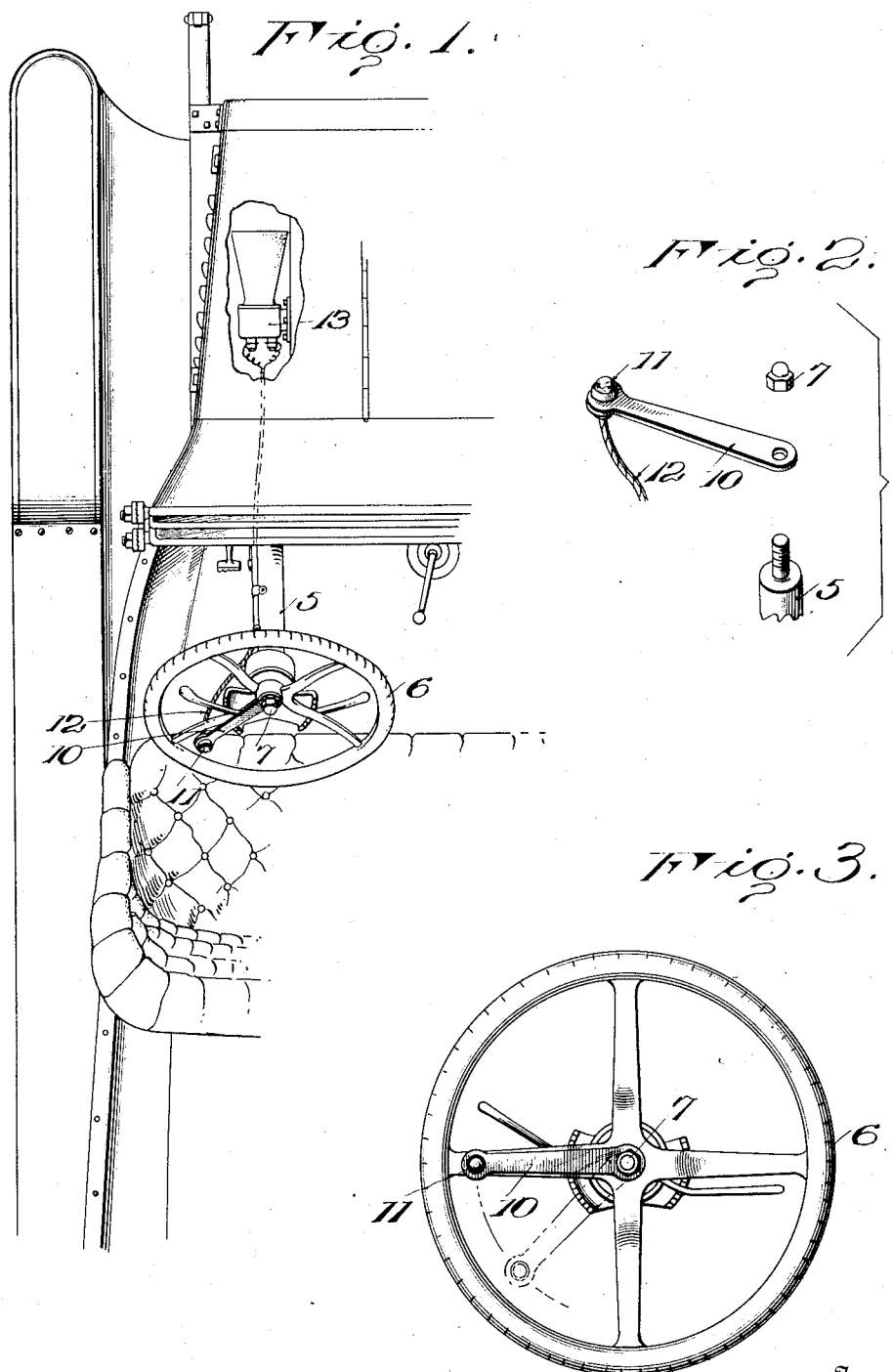

UNITED STATES PATENT OFFICE.

DAVID L. WINTERS, OF PHILADELPHIA, PENNSYLVANIA.

AUTOMOBILE ATTACHMENT.

1,278,410.

Specification of Letters Patent.

Patented Sept. 10, 1918.

Application filed May 22, 1917. Serial No. 170,233.

*To all whom it may concern:*

Be it known that I, DAVID L. WINTERS, a citizen of the United States, residing at Philadelphia, in the county of Philadelphia and State of Pennsylvania, have invented certain new and useful Improvements in Automobile Attachments, of which the following is a specification.

This invention relates to attachments for automobiles and more particularly to devices adapted to be applied to the steering wheels of automobiles now in use for the purpose of sounding a horn or actuating some other signal.

One of the objects of the present invention is to provide a simple and practical attachment which may be easily applied to the steering mechanism of automobiles now in general use without material alteration thereof for the purpose of rendering the actuation of certain signals such as the horn, for example, quicker and more convenient for the driver. A further object is to provide an attachment of the above general character which will be inexpensive to manufacture, reliable in use, and convenient in operation. A further object is to provide a device of the above general character capable of ready adjustment in order that it may be most conveniently positioned with respect to the driver's hand.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof, all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, in which—

Figure 1 is a plan view of the complete device showing its application to the steering wheel of an automobile;

Fig. 2 is a detail perspective view of the disassembled parts;

Fig. 3 is a top plan view of the steering wheel and attachment.

In order that a clearer perception of the present invention may be had and the objects sought to be accomplished thereby it may be stated that the hereinafter described construction plays an important part under certain conditions as shown by the following considerations.

It is therefore the object of this invention to provide an adjustable support for the push button which will permit of its ready and convenient adjustment for use by either hand, and without interfering with the free slipping of the hands around the steering wheel when engaged in cranking, cramping, backing, or turning the car.

Referring now to the drawings in detail and more particularly to Fig. 1, 5 denotes the usual steering post provided with a hand wheel 6 at the upper part thereof, being secured to the post by means of a central nut 7. Also attached to the steering post between this nut and the wheel to turn with the same is an arm 10 provided at its outer end with a contact button 11. This arm is preferably of inexpensive sheet metal stamped into shape and has associated therewith the necessary wires 12 leading down through or around the steering post to a horn 13 as desired. While as herein shown and described the attachment is particularly applicable for automobile horns or other audible signals, it is of course to be understood that it is applicable to other uses as well, such as turning on or off a search light, dimming or turning off the headlights when passing other automobiles, etc.

It is, in fact, the object of this invention to provide a convenient and adjustable support for any or all push buttons which require operation while the car is in motion, and in such manner that they may be operated with either hand and without relinquishing the grip upon the steering wheel.

As the arm 10 is frictionally held in adjusted position upon the steering post 5, it may be conveniently moved when desired to suit the wishes of the driver. For instance, a tall driver generally finds it more convenient to grip the steering wheel near the upper part thereof, while a smaller driver generally takes the wheel farther down on the sides or even near the bottom. With the present attachment the push button 11 may be moved to any desired position either for right or left handed persons or at the top or bottom of the wheel as best suits the convenience of the driver, as indicated in Fig. 3. It is the intention to have the push button directly under the thumb of the operator adjacent the point where it is most natural for the operator to grip the wheel in operating a machine.

It is believed that the present invention requires no description of its method of use and operation other than the above. The device is of simple, practical and inexpensive construction, reliable and efficient in use and operation and adapted to accomplish, among others, all of the objects and advantages herein set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claim.

I claim:

In combination, a steering post and a wheel carried thereby, a nut for securing said wheel on said post, an attachment comprising an arm having a hole at its inner end adapted to take over the steering post and between the wheel and its securing nut and to be frictionally held in place, the free end of said arm extending above the wheel with its outer end in close proximity to the rim thereof, and provided with a circuit closer on the said outer end with wires leading therefrom, said arm being adapted to turn with the wheel and to be readily adjusted to any desired position radially thereof, whereby to bring the circuit closer carried thereby within reach of the hand of the operator without necessitating the moving of the hand around the rim of the wheel or its removal therefrom.

In testimony whereof I affix my signature in presence of two witnesses.

DAVID L. WINTERS.

Witnesses:
EMILY F. CAMP,
K. E. KLEIN.